United States Patent
Okur et al.

(10) Patent No.: US 11,940,525 B2
(45) Date of Patent: Mar. 26, 2024

(54) DETECTION AND ESTIMATION OF SPIN

(71) Applicant: RAPSODO PTE. LTD., Singapore (SG)

(72) Inventors: Batuhan Okur, Singapore (SG); Roshan Gopalakrishnan, Singapore (SG); Saurabh Garg, Singapore (SG); Lodiya Radhakrishnan Vijayanand, Singapore (SG)

(73) Assignee: RAPSODO PTE. LTD., Singapore (SG)

( * ) Notice: Subject to any disclaimer, the term of this patent is extended or adjusted under 35 U.S.C. 154(b) by 212 days.

(21) Appl. No.: 17/462,276

(22) Filed: Aug. 31, 2021

(65) Prior Publication Data
US 2023/0065614 A1    Mar. 2, 2023

(51) Int. Cl.
   G01S 13/58    (2006.01)
   G01S 7/04     (2006.01)
   G01S 7/295    (2006.01)

(52) U.S. Cl.
   CPC .......... *G01S 13/589* (2013.01); *G01S 7/046* (2013.01); *G01S 7/295* (2013.01)

(58) Field of Classification Search
   None
   See application file for complete search history.

(56) References Cited

U.S. PATENT DOCUMENTS

| | | | |
|---|---|---|---|
| 2015/0105172 A1* | 4/2015 | Thurman | A63B 71/0669 473/199 |
| 2016/0339320 A1* | 11/2016 | Johnson | G06F 1/1626 |
| 2020/0298092 A1* | 9/2020 | Okur | A63B 24/0021 |
| 2020/0398138 A1* | 12/2020 | Hendrix | A63F 13/213 |

FOREIGN PATENT DOCUMENTS

JP    2012-068163 A    4/2012

OTHER PUBLICATIONS

JP2012068163 machine translation (Year: 2012).*
International Search Report and Written Opinion issued in corresponding application No. PCT/IB2022/058028, dated Mar. 31, 2023.

* cited by examiner

*Primary Examiner* — Whitney Moore
(74) *Attorney, Agent, or Firm* — Scully, Scott, Murphy & Presser, PC (57) ABSTRACT

An example method to determine an object spin rate may include receiving a radar signal of a particular object in motion. The method may further include converting the radar signal into an input vector. The method may also include providing the input vector as input to a neural network. The neural network may include access to a set of initial data that has been generated based on multiple initial radar signals of multiple initial objects in motion. The method may further include determining a spin rate of the particular object in motion based on an analysis performed by the neural network of the input vector including time and frequency information of the particular object in motion in view of the set of initial data. The analysis may include comparing one or more elements of the input vector to one or more elements of the set of initial data.

19 Claims, 5 Drawing Sheets

DETECTION AND ESTIMATION OF SPIN

The embodiments discussed in the present disclosure are related to detection and estimation of spin.

BACKGROUND

Objects in motion often include an associated spin rate, among other motion attributes. Determining the spin rate may be desirable as the spin rate may contribute to understanding the trajectory of the object, the launch conditions of the object, and/or other factors related to the motion of the object. In some circumstances, determining the spin rate of an object may be accomplished with a number of high-cost sensors. The high-cost sensors may also be limited in availability, both of which may limit options and/or opportunities to determine the spin rate of an object.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an embodiment, a method to determine an object spin rate may include receiving a radar signal of a particular object in motion. The method may further include converting the radar signal into an input vector. The input vector may include time and frequency information of the particular object in motion. The method may also include providing the input vector as input to a neural network. The neural network may include access to a set of initial data that has been generated based on multiple initial radar signals of multiple initial objects in motion. The method may further include determining a spin rate of the particular object in motion based on an analysis performed by the neural network of the input vector including time and frequency information of the particular object in motion in view of the set of initial data. The analysis may include comparing one or more elements of the input vector to one or more elements of the set of initial data.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Deep learning may be employed, such as through the use of a neural network, to determine the spin rate of an object using a modified radar signal of the object in motion. In some circumstances, the neural network may be trained using many datasets of known spin rates and radar signals. The neural network may use the data from the training datasets to analyze a radar signal from an object in motion to determine the spin rate thereof.

In some circumstances, the neural network may be configured to identify portions of an image based on a radar signal to compare to similar portions of initial time-frequency images having a known spin rate. The neural network may be configured to determine the spin rate of the object in motion based on an analysis between the time-frequency images.

Figure 1:
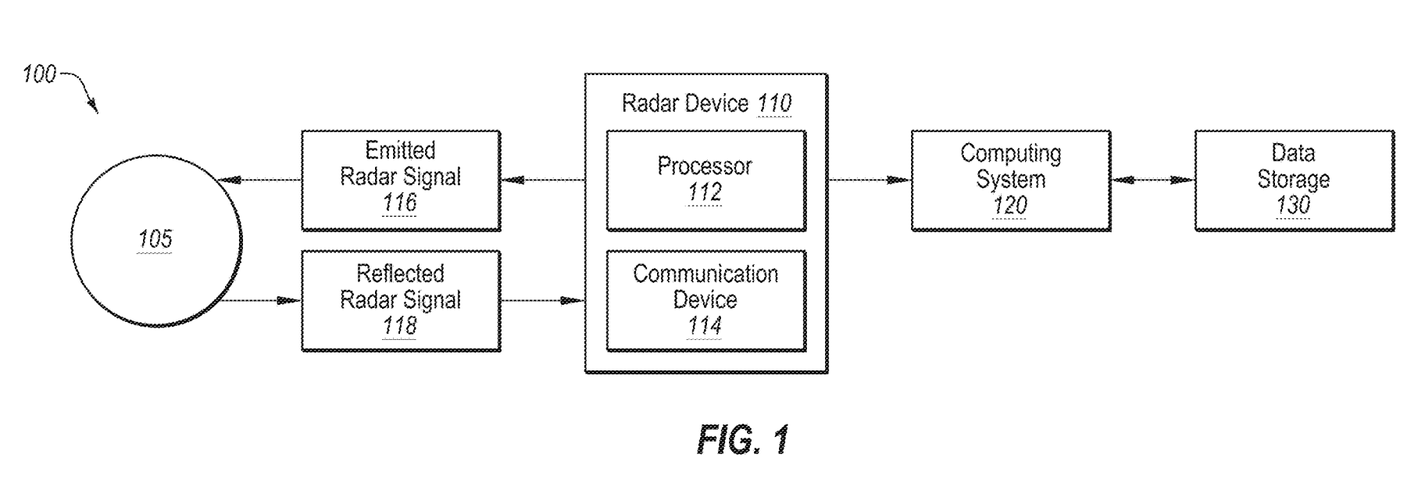
FIG. 1 illustrates a block diagram of an example environment that includes detection and estimation of spin.

FIG. 1 illustrates a block diagram of an example environment 100 that includes detection and estimation of spin, in accordance with at least one embodiment described in the present disclosure. The environment 100 may include an object in motion 105, a radar device 110, an emitted radar signal 116, a reflected radar signal 118, a computing system 120, and a data storage 130. The radar device 110 may include a processor 112 and a communication device 114.

In some embodiments, the radar device 110 may broadcast the emitted radar signal 116 that may be intended to be reflected off the object in motion 105. In some embodiments, the emitted radar signal 116 may include radio frequencies emitted from the radar device 110. In some embodiments, the emitted radar signal 116 may be configured to continuously broadcast from the radar device 110 once the radar device 110 is powered on. Alternatively or additionally, the emitted radar signal 116 may broadcast from the radar device 110 upon receiving a triggering input. For example, the emitted radar signal 116 may begin broadcasting from the radar device 110 upon a detection of movement by the radar device 110. Alternatively or additionally, the triggering input to the radar device 110 may include a user instruction to begin broadcasting the emitted radar signal 116.

In response to the emitted radar signal 116 reflecting off the object in motion 105, the radar device 110 may receive the reflected radar signal 118 therefrom. In some embodiments, the reflected radar signal 118 may include the emitted radar signal 116 after contacting an object. For example, the radar device 110 may broadcast a signal, such as the emitted radar signal 116, which may reflect off an object, such as the object in motion 105, and return to the radar device 110, such as the reflected radar signal 118.

In some embodiments, the radar device 110 may include the processor 112. In some embodiments, the processor 112 may include any computing device, such as the system 600 of FIG. 6. In some embodiments, the processor 112 may be configured to convert the reflected radar signal 118 into an input vector. For example, the processor 112 may apply a Fourier analysis to the reflected radar signal 118 to generate the input vector from the reflected radar signal 118. The conversion of the reflected radar signal 118 into the input vector is further described in conjunction with FIG. 3.

Alternatively or additionally, the communication device 114 of the radar device 110 may be configured to transmit the reflected radar signal 118 to a remote device, such as the computing system 120. The remote device may be configured to convert the reflected radar signal 118 into the input vector. In response to receiving the reflected radar signal 118, the remote device, such as the computing system 120, may be configured to convert the reflected radar signal 118 into the input vector, using the same or similar process as the processor 112 of the radar device 110. The conversion of the reflected radar signal 118 into the input vector is further described in conjunction with FIG. 3.

In some embodiments, the object in motion may include a ball, such as sports ball including a golf ball, a baseball, and/or other sports related balls, and/or other objects that may include a spin rate and may be trackable.

In some embodiments, the input vector may include time and frequency information related to the object in motion. For example, the input vector may include an image, such as the time-frequency image 300 of FIG. 3, that includes time and frequency elements associated with the object in motion. In some embodiments, the input vector, which includes the time-frequency image, may be generated by applying a Fourier analysis to the reflected radar signal 118. The computing system 120 may then obtain the input vector, which may be used in the analysis to determine the spin rate of the object in motion. In some embodiments, the input vector may include one or more elements that may be associated with the speed of the object in motion and/or the spin rate of the object in motion. For example, the input vector may include a main lobe and one or more side lobes that may be associated with the speed and the spin rate of the object in motion, respectively. Additional details regarding the input vector as a time-frequency image, including the main lobe and the side lobes thereof, are discussed relative to FIG. 3.

In some embodiments, the data storage 130 may be configured to store a set of initial data. The set of initial data may include multiple radar signals that may be associated with multiple objects in motion, respectively. For example, for any given object in motion that was recorded with a radar device, an associated initial radar signal and/or initial input vector may be stored within the data storage 130. Alternatively or additionally, each initial datum of the set of initial data may include an initial input vector that may have been generated from a received radar signal associated with an initial object in motion, which may be obtained using a similar process as described above relative to the input vector. For example, the set of initial data may include one or more initial input vectors associated with one or more objects in motion, each of which may include various spin rates and/or other motion components.

In these and other embodiments, each initial datum of the data storage 130 may include a spin rate associated with an initial input vector. For example, a first object in motion may include a first received radar signal that may be converted to a first input vector. Further, the first object in motion may include a first known spin rate, which first known spin rate and first input vector may be stored in the data storage 130. In these and other embodiments, the data storage 130 may include multiple iterations of initial input vectors and initial known spin rates of initial objects in motion that may be used to train the computing system 120.

In some embodiments, the elements stored within the data storage 130 may be arranged and configured to be searchable upon request. Alternatively or additionally, elements of the data storage 130 may be provided as an input to a computing system, such as the computing system 120, and may be used to train a neural network and/or other machine learning system.

In some embodiments, the computing system 120 may be communicatively coupled to the radar device 110 and/or the data storage 130. For example, the computing system 120 may be configured to receive radar signals from the radar device 110 and/or may be configured to receive and/or store data in the data storage 130.

In some embodiments, the computing system 120 may include a neural network. For example, the computing system 120 may include a convolutional neural network, a recurrent neural network, a long short-term memory, and/or other deep learning network systems. In some embodiments, the computing system 120 may be configured to access the elements of the data storage 130 to train the computing system 120 to determine the spin rate of an object in motion. For example, the computing system 120 may be trained using the elements of the data storage 130, including the radar signals of objects in motion associated with the known spin rates for the respective objects in motion.

In some embodiments, the computing system 120 may be configured to perform an analysis of the input vector of the object in motion 105 to determine and/or estimate the spin rate thereof. In some embodiments, the analysis performed by the computing system 120 may include comparing portions of the input vector to portions of the initial data of the data storage 130, of which the computing system 120 may have been trained with. In some embodiments, the computing system 120 may determine and/or estimate the spin rate of the object in motion 105 based on the results of the comparison of the input vector to the initial data of the data storage 130.

In some embodiments, the computing system 120 may determine one or more aspects of the input vector and/or the initial data of the data storage 130 may be used to compare the input vector to the initial data, which may enable the computing system 120 to determine and/or estimate the spin rate of the object in motion 105. For example, the computing system 120 may compare the number of harmonics associated with the side lobes around the main lobe, the amount of space between the harmonics of the side lobes, the rate of decay of the intensity of the side lobes over time, and/or other discernable aspects associated with the input vector and/or the initial data of the data storage 130.

In these and other embodiments, the computing system 120 may be configured to determine and/or estimate a spin rate associated with the object in motion 105 based on the comparison between the input vector (e.g., as an image) the initial input vectors of the initial data of the data storage 130. For example, in instances in which the computing system 120 identifies an initial input vector with image features (e.g., number of harmonics, spacing between the harmonics, etc.) the same or nearly the same as the input vector, the computing system 120 may determine the spin rate of the object in motion 105 using the initial known spin rate associated with the initial input vector. Alternatively or additionally, in instances in which the no initial input vector is the same or nearly the same as the input vector, the computing system 120 may extrapolate between two or more initial input vectors that are similar to the input vector. The computing system 120 may use an extrapolated spin rate between the two or more initial known spin rates associated with the two or more initial input vectors to estimate the spin rate of the object in motion 105.

In some embodiments, upon determining and/or estimating the spin rate of the object in motion 105, the computing system 120 may be configured to include the input vector and associated spin rate in the initial data of the data storage 130.

Modifications, additions, or omissions may be made to the environment 100 without departing from the scope of the present disclosure. For example, in some embodiments, the computing system 120 may be configured to communicate the determined spin rate of the object in motion to a user device for display. The user device may include a mobile device, a desktop computer, a tablet computer, and/or other user devices. In some embodiments, the user device may include a graphical user interface (GUI) that may be configured to display the determined spin rate as received from the computing system 120. In some embodiments, the computing system 120 may include a wired connection with the user device, which may include PCI, PCI Express, Ethernet, and the like. Alternatively or additionally, the computing system 120 may be configured to wirelessly communicate with the user device such as via Bluetooth®, Wi-Fi, WiMAX, cellular communications, and the like.

In some embodiments, the determined spin rate displayed on the user device may include a numeric value, a graph of the determined spin rate over time, a chart of the determined spin rate over periodic intervals of time, and/or other visual displays suitable to illustrate the determined spin rate.

Alternatively or additionally, the computing system 120 may be configured to generate a visual model of a trajectory of the object in motion. In some embodiments, the visual model may include a projected trajectory of the object in motion based on the determined spin rate. Alternatively or additionally, the visual model may include a velocity of the object in motion, a launch angle of the object in motion, and/or other factors related to the object in motion. In some embodiments, the computing system 120 may be configured to transmit the visual model to the user device, such as via the same or similar methods as described above relative to displaying the determined spin rate on the user device. For example, the computing system 120 may determine the spin rate of the object in motion, and may also determine a path, a speed, an apex, a termination point, etc., of which some or all may be combined to generate a visual model.

Alternatively or additionally, the computing system 120 may be configured to transmit the elements of the object in motion, including the determined spin rate, the speed, etc., to the user device and the user device may be configured to generate the visual model of the object in motion. In these and other embodiments, the visual model may include interactive elements, such that the user may rotate, zoom, pause, speed up, slow down, and/or otherwise interact with the visual model displayed on the user device. Further, the interactive elements presented to the user may allow the user to restrict portions of the visual model from displaying. For example, the user may desire to remove a speed portion associated with the object in motion and may make a selection in the GUI to remove the display of the speed portion of the visual model.

In some embodiments, the environment 100 may be implemented using different types of objects. For example, elements of the data storage 130 may include a first type of object, such as a golf ball, and the input vector may be generated from a second type of object, such as a baseball. In some embodiments, the computing system 120 may be trained with elements of the data storage 130 such that the computing system 120 may be configured to determine a spin rate for an input vector regardless of whether the object type of elements of the data storage 130 are similar to the object type of the input vector. Alternatively or additionally, the elements of the data storage 130 may be classified into object types such that when the computing system 120 receives an input vector associated with a first object type, the computing system 120 may use the elements of the data storage 130 that match the first object type to perform the spin rate analysis thereon.

Figure 2:
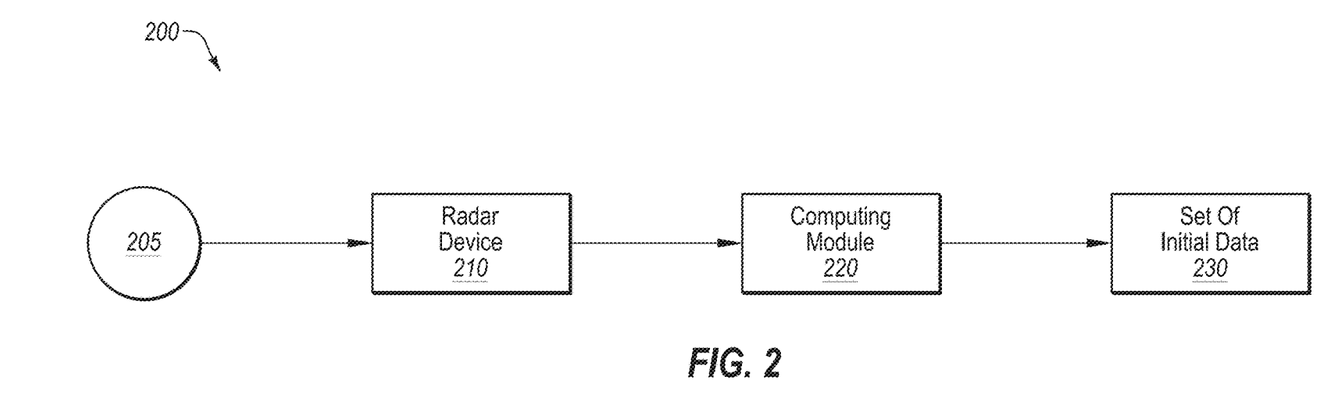
FIG. 2 illustrates a block diagram of an example system for determining a set of initial data.

FIG. 2 illustrates a block diagram of an example system 200 for determining a set of initial data, in accordance with at least one embodiment described in the present disclosure. The system 200 may include an object 205, a radar device 210, a computing module 220, and a set of initial data 230.

In some embodiments, the radar device 210 may be the same as or similar to the radar device 110 of FIG. 1. In these and other embodiments, the radar device 210 may be configured to emit a radar signal and receive a corresponding reflected radar signal from an object in motion, such as the object 205. In some embodiments, more than one radar device may be included in the radar device 210. For example, two or more radar devices may be configured to emit and receive radar signals associated with the object in motion. Alternatively or additionally, multiple radar devices of the radar device 210 may be configured to emit and receive radar signal associated with multiple objects in motion. For example, multiple radar devices may be configured to track one object in motion, a number of objects in motion equal to the number of multiple radar devices, and/or any combination of any number of radar devices configured to track any number of objects in motion. In these and other embodiments, each received radar signal from the radar device 210 may be converted into an initial input vector.

In some embodiments, the radar device 210 may be configured to convert the received radar signal (e.g., reflected from the object in motion) into the initial input vector. The initial input vector may include time and frequency information associated with the object in motion. For example, the initial input vector may be obtained by a Fourier analysis on the received radar signal, which may include a representation of the object in motion as a frequency over time. Alternatively or additionally, the radar device 210 may be configured to transmit the received radar signal to another device, such as the computing module 220, which other device may be configured to convert the received radar signal into the initial input vector.

In some embodiments, the initial input vector may include an image. For example, the initial input vector may be a time-frequency image illustrating the object in motion and its related characteristics as an image of frequency changing over time.

In some embodiments, the object 205 may include a ball, such as a sports ball. For example, the object 205 may include a golf ball, a baseball, a volleyball, and/or other various sports balls. Alternatively or additionally, the object 205 may include any non-ball object so long as the object may be tracked by the radar device 210 and may include a spin rate.

In some embodiments, the computing module 220 may be the same as or similar to the computing system 120 of FIG. 1. Alternatively or additionally, the computing module 220 may include any computing device, such as the system 600 of FIG. 6. In some embodiments, the computing module 220 may be communicatively coupled with the radar device 210 and/or the set of initial data 230.

In some embodiments, the computing module 220 may obtain the initial input vector from the radar device 210. Alternatively or additionally, the computing module 220 may be configured to obtain the received radar signal and the computing module 220 may be configured to generate the initial input vector from the received radar signal. In these and other embodiments, the computing module 220 may be configured to determine a spin rate from the initial input vector which may be stored as a known spin rate datum. The known spin rate datum may include the determined spin rate associated with a time-frequency image, as obtained from the initial input vector. In some embodiments, the determined spin rate may be obtained from the computing module 220 processing the initial input vector, which may include converting time series data from the radar signal to a frequency domain signal using a Fourier transform, and combining the time series data and the frequency domain signal into a time-frequency image. In some embodiments, the computing module 220 may be configured to transfer the known spin rate datum to the set of initial data 230.

In some embodiments, the set of initial data 230 may be configured to store the output from the computing module 220. In some embodiments, the set of initial data 230 may be the same as or similar to the data storage 130 of FIG. 1. For example, the set of initial data 230 may include multiple known spin rate data entries that may be used to train a neural network, such as the computing system 120 of FIG. 1.

Figure 3:
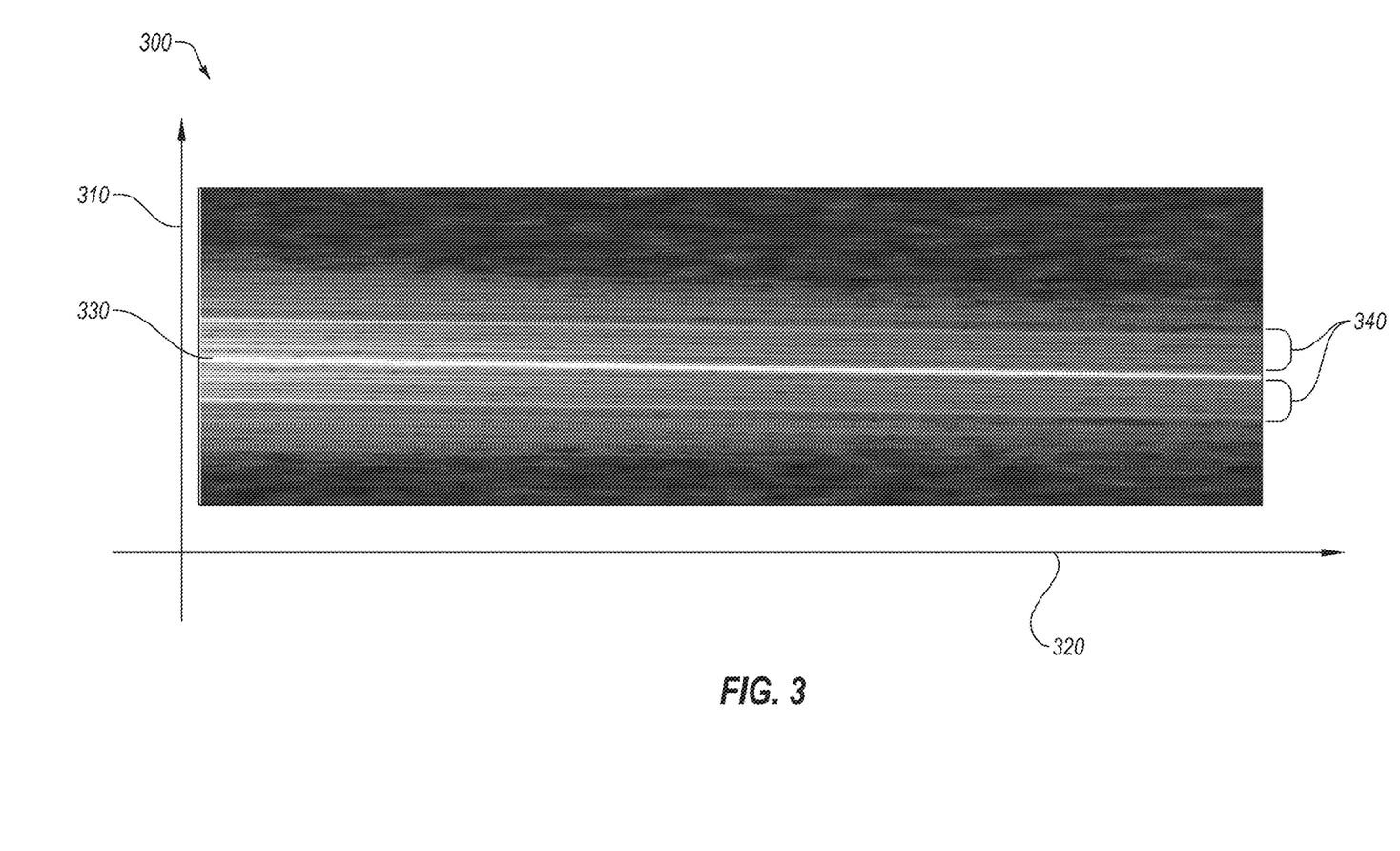
FIG. 3 illustrates a time-frequency image of an object in motion.

FIG. 3 illustrates a time-frequency image 300 (hereinafter referred to as "TFI 300") of an object in motion, in accordance with at least one embodiment described in the present disclosure. The TFI 300 may include a frequency axis 310, a time axis 320, a main lobe 330, and side lobes 340.

In some embodiments, the TFI 300 may be generated from a radar signal, such as the reflected radar signal 118 of FIG. 1, of an object in motion, such as the object in motion 105 of FIG. 1, using a Fourier analysis performed thereon. For example, a radar signal of an object in motion may be obtained from a radar device, such as the radar device 110 of FIG. 1, and the radar signal may be transformed into the TFI 300 using a Fourier analysis.

In some embodiments, the TFI 300 may be iteratively generated from the radar signal in discrete elements. For example, a first portion of the radar signal may be transformed by Fourier analysis into first time and frequency elements. After the first portion, a second portion of the radar signal may be transformed by Fourier analysis into second time and frequency elements, and so forth. The first portion may be illustrated as frequency elements of the object in motion during a first time, the second portion illustrated as frequency elements of the object in motion during a second time, and so forth. The first portion, the second portion, and all subsequent portions may be assembled into the TFI 300, which may be the input vector that may be an input to a computing device, such as the computing system 120 of FIG. 1. Alternatively or additionally, the TFI 300 may be generated from a continuous transformation of the radar signal into time and frequency elements and assembled together into an image illustrating the frequency elements over time.

Alternatively or additionally, the TFI 300 may be generated by any radar processing algorithm that may be configured to convert time-series data based on the radar signal into a time-frequency image.

In some embodiments, the TFI 300 may illustrate an object in motion as a frequency relative to time. For example, the object in motion may be represented as a linear frequency relative to the frequency axis 310 and the time axis 320. The linear frequency of the object in motion may include the main lobe 330 and/or the side lobes 340.

In some embodiments, the main lobe 330 may include a higher energy when compared to the side lobes 340, which may include a lower energy when compared to the main lobe 330. For example, the main lobe 330 may be illustrated as including a frequency band that is wider than any one of the side lobes 340 which may represent a higher energy than any one side lobe of the side lobes 340. Alternatively or additionally, the intensity of the main lobe 330 in the TFI 300 may be illustrated as greater than the intensity of any one side lobe of the side lobes 340.

In some embodiments, the side lobes 340 may be symmetrically disposed around the main lobe 330. For example, given a main lobe 330 in a TFI 300, the side lobes 340 on either side of the main lobe 330 may be equivalent in number and spacing relative to the main lobe 330. Alternatively or additionally, the side lobes 340 may include asymmetric elements relative to the main lobe 330, such as more side lobes 340 on one side of the main lobe 330 than the other. In these and other embodiments, the side lobes 340 may include harmonic frequencies centered about the main lobe 330.

In some embodiments, the main lobe 330 of the TFI 300 may represent a speed of the object in motion, that may have been transformed into frequency and time elements. Alternatively or additionally, the side lobes 340 of the TFI 300 may represent a spin rate of the object in motion, that may have been transformed into frequency and time elements. In some embodiments, the main lobe 330 may be substantially horizontal relative to the time axis 320, which may indicate a substantially similar frequency over time. Alternatively or additionally, the main lobe 330 and/or the side lobes 340 may include frequencies and/or intensities that vary in time which may be associated with changes in the object speed and/or spin rate over time. For example, as illustrated in the TFI 300, the main lobe 330 includes a declining frequency and a diminishing intensity over time which may be associated with the speed of the object of the TFI 300 decreasing over time.

Figure 4:
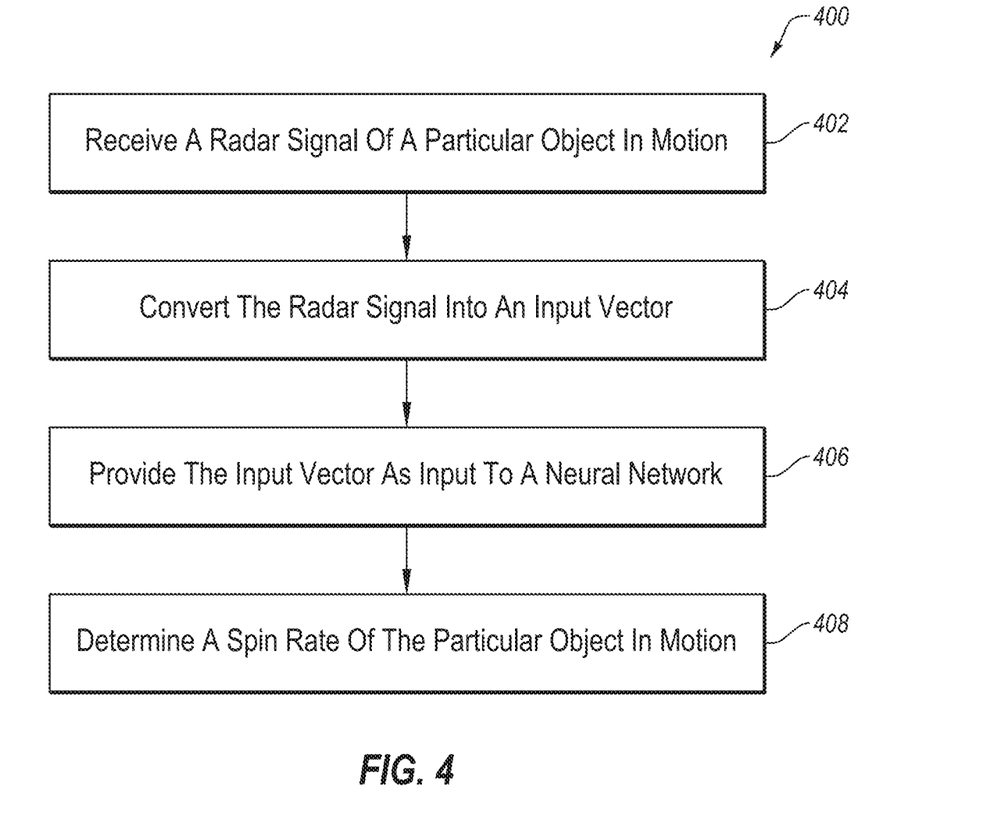
FIG. 4 illustrates a flowchart of an example method of detection and estimation of spin.

FIG. 4 illustrates a flowchart of an example method 400 of detection and estimation of spin, in accordance with at least one embodiment described in the present disclosure. The method 400 may be arranged in accordance with at least one embodiment described in the present disclosure.

The method may be performed by processing logic that may include hardware (circuitry, dedicated logic, etc.), software (such as is run on a general purpose computer system or a dedicated machine), or a combination of both, which processing logic may be included in the computing system 120 of FIG. 1, the computing module 220 of FIG. 2, or another computer system or device. However, another system, or combination of systems, may be used to perform the methods.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 400 may begin at block 402 where the processing logic may receive a radar signal of a particular object in motion.

At block 404, the processing logic may convert the radar signal into an input vector. The input vector may include time and frequency information of the particular object in motion. In some embodiments, the time and frequency information of the input vector may include a time-frequency image. In some embodiments, the time-frequency image may be obtained by performing a Fourier analysis on the radar signal.

In some embodiments, the time-frequency image may include a main lobe and one or more side lobes modulated symmetrically about the main lobe. In some embodiments, the main lobe may include a higher energy portion of the input vector relative to lower energy portions of the input vector associated with the one or more side lobes. In some embodiments, the main lobe may be illustrated in the time-frequency image as a substantially linear frequency changing over time. In some embodiments, the main lobe of the time-frequency image may indicate a speed of the particular object in motion and the one or more side lobes of the time-frequency image may indicate the spin rate of the particular object in motion.

At block 406, the processing logic may provide the input vector as input to a neural network. The neural network may include access to a set of initial data that has been generated based on multiple initial radar signals of multiple initial objects in motion. In some embodiments, a first datum of the set of initial data may include a first spin rate of an initial object in motion associated with a first time and frequency information of the initial object in motion. In some embodiments, the particular object in motion may be a first type of object and the multiple initial objects in motion may include a second type of object.

At block 408, the processing logic may determine a spin rate of the particular object in motion based on an analysis performed by the neural network of the input vector including time and frequency information of the particular object in motion in view of the set of initial data. The analysis may include comparing one or more elements of the input vector to one or more elements of the set of initial data. In some embodiments, the analysis performed by the neural network may include a comparison of a first set of harmonics of the input vector to a second set of harmonics of a time-frequency image in the set of initial data.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include displaying a visualization of the spin rate. Alternatively or additionally, the method 400 may further include displaying a simulated visual model of a trajectory of the particular object.

Figure 5:
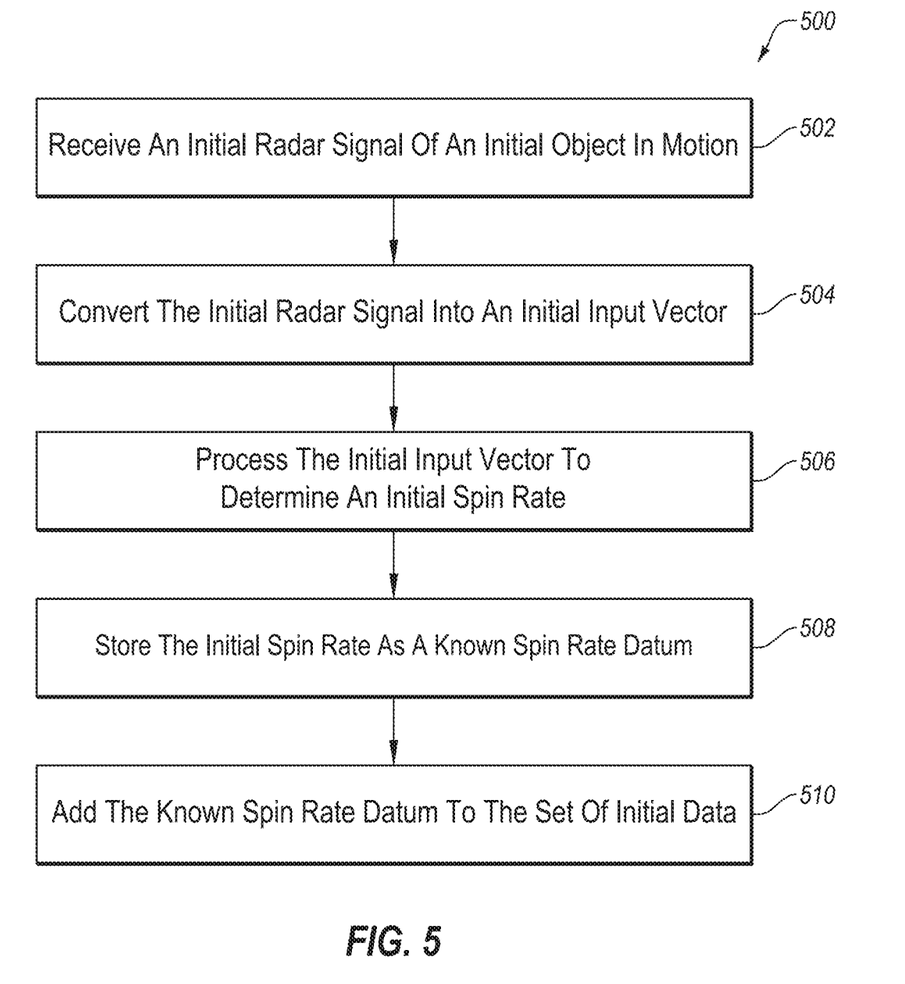
FIG. 5 illustrates a flowchart of an example method of obtaining a set of initial data.

FIG. 5 illustrates a flowchart of an example method 500 of obtaining a set of initial data, in accordance with at least one embodiment described in the present disclosure. The method 500 may be arranged in accordance with at least one embodiment described in the present disclosure.

The method 500 may be performed by processing logic that may include hardware (circuitry, dedicated logic, etc.), software (such as is run on a general purpose computer system or a dedicated machine), or a combination of both, which processing logic may be included in the computing system 120 of FIG. 1, the computing module 220 of FIG. 2, or another computer system or device. However, another system, or combination of systems, may be used to perform the method 500.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 500 may begin at block 502 where the processing logic may receive an initial radar signal of an initial object in motion.

At block 504, the processing logic may convert the initial radar signal into an initial input vector including initial time and frequency information.

At block 506, the processing logic may process the initial input vector to determine an initial spin rate.

At block 508, the processing logic may store the initial spin rate as a known spin rate datum.

At block 510, the processing logic may add the known spin rate datum to the set of initial data.

Figure 6:
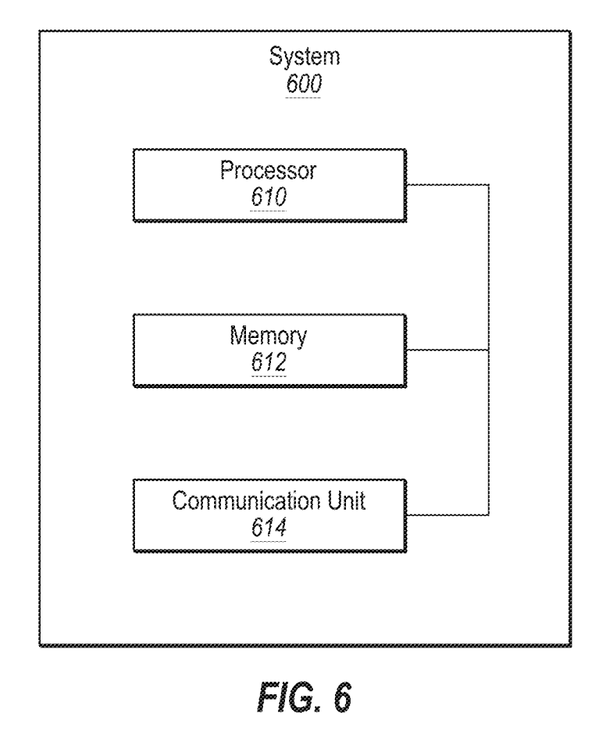
FIG. 6 illustrates an example system that may be used for detection and estimation of spin.

FIG. 6 is a block diagram illustrating an example system 600 that may be used for detection and estimation of spin, according to at least one embodiment of the present disclosure. The system 600 may include a processor 610, memory 612, and a communication unit 616, which all may be communicatively coupled. In some embodiments, the system 600 may be part of any of the systems or devices described in this disclosure.

For example, the system 600 may be part of the computing system 120 or the processor 112 of the radar device 110 of FIG. 1 and may be configured to perform one or more of the tasks described above with respect to the computing system 120 or the processor 112. As another example, the system 600 may be part of the computing module 220 of FIG. 2 and may be configured to perform one or more of the tasks described above.

Generally, the processor 610 may include any computing entity, or processing device including various computer hardware or software modules and may be configured to execute instructions stored on any applicable computer-readable storage media. For example, the processor 610 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of networks or physical locations that are configured to perform individually or collectively any number of operations described herein. In some embodiments, the processor 610 may interpret and/or execute program instructions and/or process data stored in the memory 612. In some embodiments, the processor 610 may execute the program instructions stored in the memory 612.

For example, in some embodiments, the processor 610 may execute program instructions stored in the memory 612 that are related to path encoding with delay constraints such that the system 600 may perform or direct the performance of the operations associated therewith as directed by the instructions. In these and other embodiments, the instructions may be used to perform the method 400 of FIG. 4, or the method 500 of FIG. 5.

The memory 612 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 610 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

The communication unit 616 may include any component, device, system, or combination thereof that is configured to transmit or receive information over a network. In some embodiments, the communication unit 616 may communicate with other devices at other locations, the same location, or even other components within the same system. For example, the communication unit 616 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 616 may permit data to be exchanged with a network and/or any other devices or systems described in the present disclosure. For example, when the system 600 is included in the computing system 120 of FIG. 1, the communication unit 616 may allow the computing system 120 to communicate with the radar device 110 and/or the data storage 130.

Modifications, additions, or omissions may be made to the system 600 without departing from the scope of the present disclosure. For example, in some embodiments, the system 600 may include any number of other components that may not be explicitly illustrated or described. Further, depending on certain implementations, the system 600 may not include one or more of the components illustrated and described.

As indicated above, the embodiments described herein may include the use of a computing system (e.g., the processor 610 of FIG. 6) including various computer hardware or software modules, as discussed in greater detail below. Further, as indicated above, embodiments described herein may be implemented using computer-readable media (e.g., the memory 612 of FIG. 6) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
   receiving a radar signal of an object in motion;
   converting the radar signal into an input vector, the input vector including time and frequency information of the object in motion;
   providing the input vector as input to a neural network, where the neural network has access to a set of initial data that has been generated based on a plurality of initial radar signals of a plurality of initial objects in motion; and
   determining a spin rate of the object in motion based on an analysis performed by the neural network of the input vector including time and frequency information of the object in motion in view of the set of initial data, the analysis including comparing a first set of harmonics of the input vector to a second set of harmonics of a time-frequency image in the set of initial data.

2. The method of claim 1, wherein the time and frequency information of the input vector includes a time-frequency image.

3. The method of claim 2, wherein the time-frequency image is obtained by performing a Fourier analysis on the radar signal.

4. The method of claim 2, wherein the time-frequency image includes a main lobe and one or more side lobes modulated symmetrically about the main lobe, wherein the main lobe comprises a higher energy portion of the input vector relative to lower energy portions of the input vector associated with the one or more side lobes.

5. The method of claim 4, wherein the main lobe is illustrated in the time-frequency image as a substantially linear frequency changing over time.

6. The method of claim 4, wherein the main lobe of the time-frequency image indicates a speed of the object in motion and the one or more side lobes of the time-frequency image indicate the spin rate of the object in motion.

7. The method of claim 1, further comprising obtaining the set of initial data, wherein obtaining an initial datum of the set of initial data comprises:
   receiving an initial radar signal of an initial object in motion;
   converting the initial radar signal into an initial input vector including initial time and frequency information;
   processing the initial input vector to determine an initial spin rate;
   storing the initial spin rate as a known spin rate datum; and
   adding the known spin rate datum to the set of initial data.

8. The method of claim 1, wherein a first datum of the set of initial data includes a first spin rate of an initial object in motion associated with a first time and frequency information of the initial object in motion.

9. The method of claim 1, further comprising:
   displaying a visualization of the spin rate; and
   displaying a simulated visual model of a trajectory of the object.

10. The method of claim 1, wherein the object in motion is a first type of object and the plurality of initial objects in motion include a second type of object.

11. The method of claim 10, further comprising:
    receiving a first radar signal of the first type of object;
    converting the first radar signal into a first input vector, the first input vector including time and frequency information of the first type of object;
    providing the first input vector as input to the neural network, where the neural network has access to a second set of data that has been generated based on a plurality of second radar signals of a plurality of a second type of objects; and
    determining a spin rate of the first type of object based on an analysis performed by the neural network of the first input vector including time and frequency information of the first type of object in view of the second set of data, the analysis including comparing one or more elements of the first input vector to one or more elements of the second set of data.

12. A system, comprising:
    a memory; and
    a processor operatively coupled to the memory, the processor being configured to execute operations that, when executed, cause the processor to:
      receive a radar signal of an object in motion;
      convert the radar signal into an input vector, the input vector including time and frequency information of the object in motion;

provide the input vector as input to a neural network, where the neural network has access to a set of initial data that has been generated based on a plurality of initial radar signals of a plurality of initial objects in motion; and determine a spin rate of the object in motion based on an analysis performed by the neural network of the input vector including time and frequency information of the object in motion in view of the set of initial data, the analysis including comparing a first set of harmonics of the input vector to a second set of harmonics of a time-frequency image in the set of initial data.

13. The system of claim 12, wherein the time and frequency information of the input vector includes a time-frequency image obtained by performing a Fourier analysis on the radar signal.

14. The system of claim 13, wherein the time-frequency image includes a main lobe and one or more side lobes modulated symmetrically about the main lobe, wherein the main lobe comprises a higher energy portion of the input vector relative to lower energy portions of the input vector associated with the one or more side lobes.

15. The system of claim 14, wherein the main lobe of the time-frequency image indicates a speed of the object in motion and the one or more side lobes of the time-frequency image indicate the spin rate of the object in motion.

16. The system of claim 12, further comprising:
displaying a visualization of the spin rate; and
displaying a simulated visual model of a trajectory of the object.

17. A non-transitory computer-readable medium having encoded therein programming code executable by a processor to perform operations comprising:
receiving a radar signal of an object in motion;
converting the radar signal into an input vector, the input vector including time and frequency information of the object in motion;
obtaining a set of initial data, wherein an initial datum of the set of initial data comprises:
receiving an initial radar signal of an initial object in motion;
converting the initial radar signal into an initial input vector including initial time and frequency information;
processing the initial input vector to determine an initial spin rate;
storing the initial spin rate as a known spin rate datum; and
adding the known spin rate datum to the set of initial data;
providing the input vector as input to a neural network, where the neural network has access to the set of initial data; and
determining a spin rate of the object in motion based on an analysis performed by the neural network of the input vector including time and frequency information of the object in motion in view of the set of initial data, the analysis including comparing a first set of harmonics of the input vector to a second set of harmonics of a time-frequency image in the set of initial data.

18. The non-transitory computer-readable medium of claim 17, wherein a first datum of the set of initial data includes a first spin rate of an initial object in motion associated with a first time and frequency information of the initial object in motion.

19. The non-transitory computer-readable medium of claim 17, wherein the initial object in motion is a first type of object and the object in motion is a second type of object.

* * * * *